(12) United States Patent
Chiang

(10) Patent No.: US 10,086,902 B2
(45) Date of Patent: Oct. 2, 2018

(54) BICYCLE COMPONENT FASTENING DEVICE

(71) Applicant: TH Industries Co., Ltd., Taichung (TW)

(72) Inventor: Douglas Chiang, Taichung (TW)

(73) Assignee: TH Industries Co., Ltd., Taichung (TW)

( * ) Notice: Subject to any disclaimer, the term of this patent is extended or adjusted under 35 U.S.C. 154(b) by 217 days.

(21) Appl. No.: 14/753,017

(22) Filed: Jun. 29, 2015

(65) Prior Publication Data
US 2016/0377106 A1    Dec. 29, 2016

(51) Int. Cl.
 *B62L 3/02* (2006.01)
 *B62K 21/12* (2006.01)
 *B62K 23/06* (2006.01)
(52) U.S. Cl.
 CPC .............. *B62L 3/02* (2013.01); *B62K 21/125* (2013.01); *B62K 23/06* (2013.01)
(58) Field of Classification Search
 CPC .......... F16B 7/0413; F16B 7/02; F16B 7/025; F16B 2/04; Y10T 403/7064; Y10T 403/7066; Y10T 403/7067; Y10T 403/7069; Y10T 403/557; Y10T 403/7051; Y10T 403/7052; Y10T 403/7056; Y10T 403/7058; Y10T 74/20438; B62L 3/02; B62K 23/06
 USPC .... 403/158, 109, 211, 350, 374, 379, 379.4, 403/409.1, 102, 183
 See application file for complete search history.

(56) References Cited

U.S. PATENT DOCUMENTS

| | | | | |
|---|---|---|---|---|
| 2,508,039 A | * | 5/1950 | Neuwirth | F16B 7/1463 248/188.5 |
| 2,999,706 A | * | 9/1961 | Wilcox | F16B 7/1463 403/370 |
| 3,145,669 A | * | 8/1964 | Kupski | A47B 9/083 108/148 |
| 3,227,113 A | * | 1/1966 | Kupski | A47C 3/285 108/148 |
| 4,134,703 A | * | 1/1979 | Hinners | A63C 11/221 248/188.5 |
| 4,856,929 A | * | 8/1989 | Smahlik | A47L 1/06 248/161 |
| 6,076,797 A | * | 6/2000 | Schnautz | B29C 33/04 220/235 |
| 7,422,526 B2 | * | 9/2008 | Nemeckay | A63B 57/00 403/370 |

(Continued)

*Primary Examiner* — Matthieu F Setliff
(74) *Attorney, Agent, or Firm* — Chieh-Mei Wang

(57) ABSTRACT

A bicycle component fastening device includes a bicycle component body having a beam, a first adjusting element, a second adjusting element and a fastening element. The first adjusting element has a first assembly end and is fixedly coupled with the beam. The second adjusting element is coupled with the beam and has a second assembly end and an operating element. The operating element drives the second adjusting element to move towards or away from the first adjusting element. The fastening element has a first assembly portion engaging the first assembly end and a second assembly portion engaging the second assembly end. When the operating element drives the second adjusting element to move close to the first adjusting element, part of the second assembly end slips out of the second assembly portion such that the fastening element moves away from the beam.

9 Claims, 4 Drawing Sheets

(56) References Cited

U.S. PATENT DOCUMENTS

| | | | | |
|---|---|---|---|---|
| 2003/0052460 A1* | 3/2003 | Choy | ............ | F16B 7/025 |
| | | | | 277/607 |
| 2003/0053858 A1* | 3/2003 | Choy | ............ | F16B 7/025 |
| | | | | 403/374.4 |
| 2011/0048161 A1* | 3/2011 | Shipman | ............ | F16C 1/16 |
| | | | | 74/502.2 |
| 2013/0333994 A1 | 12/2013 | Jordan et al. | | |

* cited by examiner

BICYCLE COMPONENT FASTENING DEVICE

FIELD OF THE INVENTION

The present invention relates to a fastening device, and more particularly to a bicycle component fastening device.

BACKGROUND OF THE INVENTION

Typical bicycle components such as bicycle brakes are usually driven by cables or hydraulic means. Hydraulic brakes are driven, by hydraulic tubes which are not easily broken or loosened due to pulling. Hydraulic brakes can increase safety of braking, and therefore are widely used.

Currently, some bicycles (e.g. bicycles for time trial or triathlon race) need to satisfy aerodynamics. The braking lines of the brakes need to be hidden inside handlebars and frames to reduce wind resistance.

However, arranging a braking line inside a handlebar typically requires screws to be fixed in the interior of the handlebar in order to fix a. brake lever and the handlebar to each other. Fixing screws in a handlebar creates inconvenience when assembling brake levers and handlebars. Additionally, screws arranged in a handlebar reduce the amount of space for accommodating a braking line in the handlebar.

SUMMARY OF THE INVENTION

The present disclosure provides a bicycle component fastening device, for solving problems caused by conventional techniques.

An embodiment of the present disclosure discloses a bicycle component fastening, device installed on a handlebar. The bicycle component fastening device includes a bicycle component body, such as a brake operating assembly having an beam partially disposed in the handlebar, a first adjusting element disposed at the beam and having a first assembly end, a second adjusting element movably disposed at the beam and having a second assembly end and an operating element exposed to the outside next to the handlebar and configured to drive the second adjusting element to move towards or away from the first adjusting element, and a fastening element having a first assembly portion and a second assembly portion opposite to each other, wherein the first assembly end of the first adjusting element abuts the first assembly portion, the second assembly end of the second adjusting element abuts the second assembly portion; when the operating element drives the second adjusting element towards the first adjusting element, a portion of the second assembly end moves out of the second assembly portion, such that the fastening element moves away from the beam and presses against an inner wall of the handlebar.

In an embodiment of the present disclosure, the bicycle component fastening device includes an elastic element installed to an outer wall of the fastening element.

In an embodiment of the present disclosure, the fastening element has an annular groove annularly formed at an outer wall of the fastening element, for accommodating the elastic element.

In an embodiment of the present disclosure, the elastic element is a C-shaped elastic element.

In an embodiment of the present disclosure, the fastening element has at least one opening. The opening passes through the first assembly portion and the second assembly portion.

In an embodiment of the present disclosure, the first assembly portion has a first abutting face, the first abutting face contacts the first assembly end, and the first abutting face is an inclined face. The first assembly end has a first top face, and the first top face is an inclined face corresponding to the first abutting face.

In an embodiment of the present disclosure, the second assembly portion has a second abutting face, the second abutting face contacts the second assembly end, and the second abutting face is an inclined face. The second assembly end has a second top face, and the second top face is an inclined face corresponding to the second abutting face.

in an embodiment of the present disclosure, the second adjusting element is coupled by screwing to the beam. The operating element is configured to drive the second adjusting element to rotate with respect to the beam to move towards or away from the first adjusting element.

In an embodiment of the present disclosure, the bicycle component fastening device includes a restricting element disposed and fixed at the beam and selectively abutting an end of the first adjusting element distal from the second adjusting element, for restricting the farthest distance that the first adjusting element can move away from the second adjusting element.

an embodiment of the present disclosure, the beam includes an accommodating groove. The restricting element is partially accommodated in the accommodating groove.

The bicycle component fastening device of the present disclosure can use the second adjusting element to drive the fastening element, such that the fastening element is fastened to an inner wall of the handlebar of the bicycle, thus allowing the bicycle component fastening device and the handlebar of the bicycle to be securely assembled. In other words, the bicycle component fastening device of the present disclosure can be fastened to the handlebar of the bicycle without using screws, facilitating assembly by the user. Additionally, after the bicycle component fastening device of the present disclosure and the handlebar are fixed, the handlebar has a larger interior space for accommodating brake tubing.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

Figure 1:
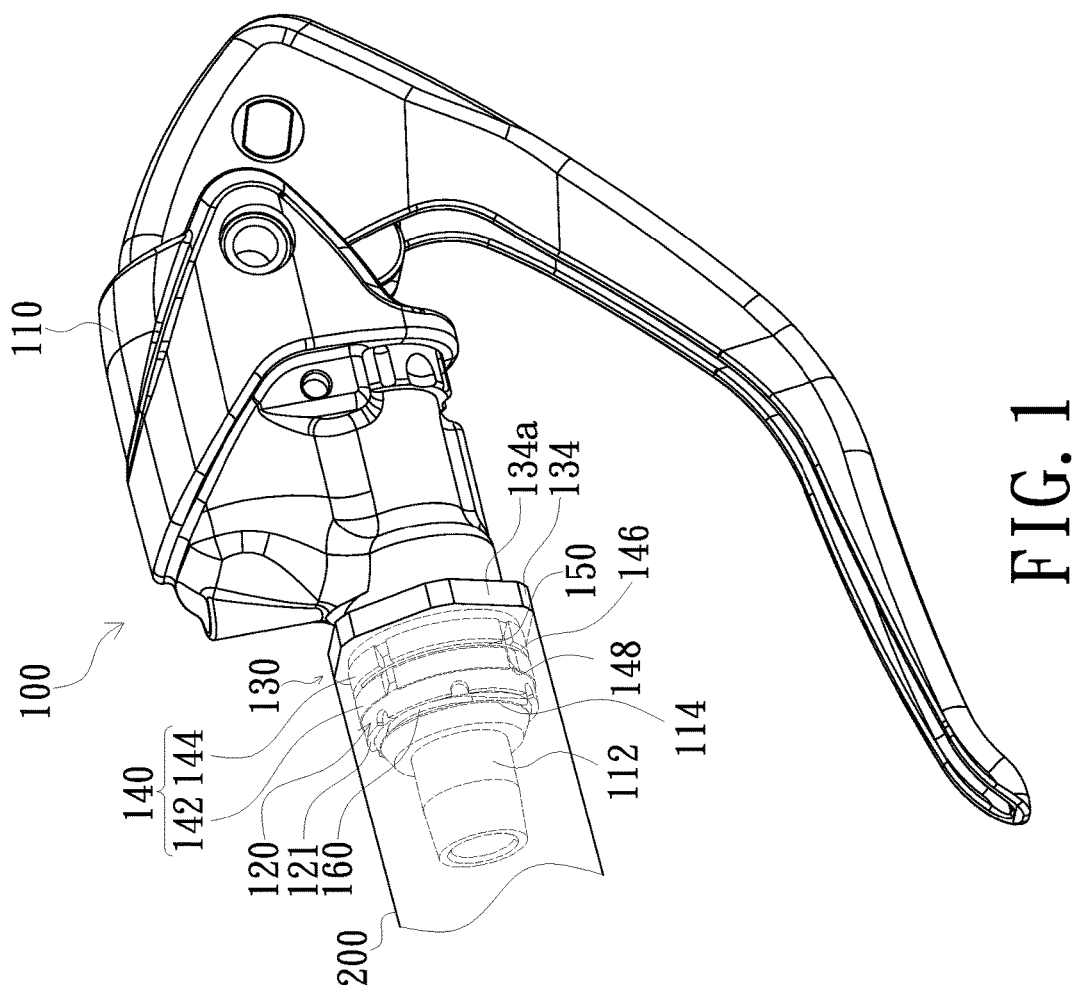
FIG. 1 shows a perspective view of a bicycle component fastening device according to an embodiment of the present disclosure.
Figure 2:
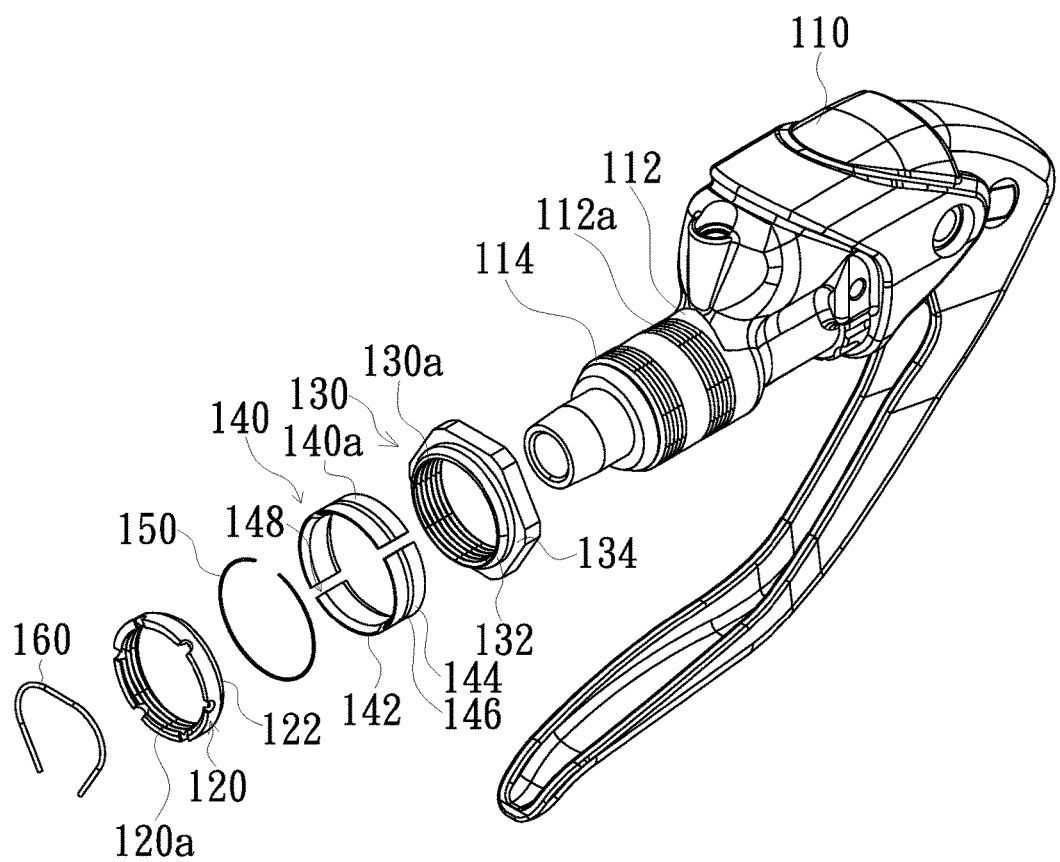
FIG. 2 shows an exploded view of the bicycle component fastening device of FIG. 1.

FIG. 1 shows a perspective view of a bicycle component fastening device according to an embodiment of the present disclosure. FIG. 2 shows an exploded view of the bicycle component fastening device of FIG. 1 As shown in FIG. 1 and FIG. 2, a bicycle component fastening device 100 of the present embodiment is installed to a handlebar 200 of a bicycle. It should be understood that the bicycle component fastening device 100 of the present embodiment can be applied to "bicycle operating devices" and other bicycle components having tubings. In other words, the bicycle component fastening device 100 of the present embodiment can be assembled to the handlebar 200 of a bicycle, and through the operating device driving tubing (not shown in the figures) in the handlebar 200 to control action of other components of the bicycle, such as brakes (not shown in the figures) achieving an effect of braking.

The bicycle component fastening device 100 of the present embodiment includes a bicycle component body 110, a first adjusting element 120, a second adjusting element 130 and a fastening element 140, wherein the bicycle component body 110 has a beam 112 partially disposed in the handlebar 200. Additionally, the first adjusting element 120, the second adjusting element 130 and the fastening element 140 are coupled to the beam 112. Specifically, inner faces of the first adjusting element 120 and the second adjusting element 130 can be each formed with screw threads 120a/130a, and an outer face of the beam 112 can be formed with a. corresponding screw thread 112a, such that the first adjusting element 120 and the second adjusting element 130 are respectively screwed to the beam 112, but not limited thereto.

Additionally, in the present embodiment, when the. bicycle component fastening device 100 is assembled to the handlebar 200, a portion of the second adjusting element 130 is disposed in the handlebar 200, and the first adjusting element 120 and the fastening element 140 are completely disposed in the handlebar 200, but not limited thereto.

Specifically, the first adjusting element 120 sleeves is fixed to the beam 112, wherein the first adjusting element 120 has a first assembly end 122. The first adjusting element 120 abuts the fastening element 140 through the first assembly end 122. In the present embodiment, the bicycle component fastening device 100 can include a restricting element 160 fixed to the beam 112 and selectively abutting an end portion 121 of the first adjusting element 120 distal from the second adjusting element 130, namely the end portion 121 opposite to the first assembly end 122. The restricting element 160 can restrict the first adjusting element 120 from moving away from the second adjusting element 130 causing detachment, thereby restricting the first adjusting element 120 to the beam 112. Specifically, the beam 112 can include an accommodating groove 114, a portion of the restricting element 160 is accommodated in the accommodating groove 114, and a portion of the restricting element 160 outside of the accommodating groove 114 can selectively abut the end portion 121 of the first adjusting element 120 distal from the second adjusting element 130. The accommodating groove 114 restricts movement of the restricting element 160, which in turn restricts movement of the first adjusting element 120 away from the second adjusting element 130. It should be understood that the present embodiment is only an example and not intended to limit the present disclosure.

The second adjusting element 130 is movably coupled to the beam 112. In other words, since the second adjusting element 130 is screwed to the beam 112, rotation of the second adjusting element 130 can cause the second adjusting element 130 to move on the beam 112 towards or away from the first adjusting element 120, but not limited thereto. The second adjusting element 130 has a second assembly end 132 and an operating element 134, wherein the operating element 134 is arranged outside of the handlebar 200 and is configured to drive the second adjusting element 130 to move towards or away from the first adjusting element 120. For example, the operating element 134 is formed with at least one grip end 134a for a user to grip, such that the user can grip the grip end 134a to rotate the operating element 134, which in turn drives the second adjusting element 130 to rotate with respect to the beam 112 and move towards or away from the first adjusting element 120, but not limited thereto.

Additionally, the fastening element 140 has a first assembly portion 142 and a second assembly portion 144 opposite to each other. The first assembly end 122 of the first adjusting element 120 abuts the first assembly portion 142, and the second assembly end 132 of the second adjusting element 130 abuts the second assembly portion 144, such that a second abutting face 144a (please refer to FIG. 3) of the second assembly portion 144 abuts a second top face 132a (please refer to FIG. 3) of the second assembly end 132. It should be understood that the second top face 132a of the second assembly end 132 is an inclined face. Additionally, the second abutting thee 144a of the second assembly portion 144 can also be an inclined face, but is not limited thereto. In the present embodiment, the fastening element 140 has at least one opening 148 passing through the first assembly portion 142 and the second assembly portion 144, avoiding the inability to couple the first adjusting element 120 and the second adjusting element 130 respectively to the first assembly portion 142 and the second assembly portion 144 due to mechanical tolerance.

Figure 3:
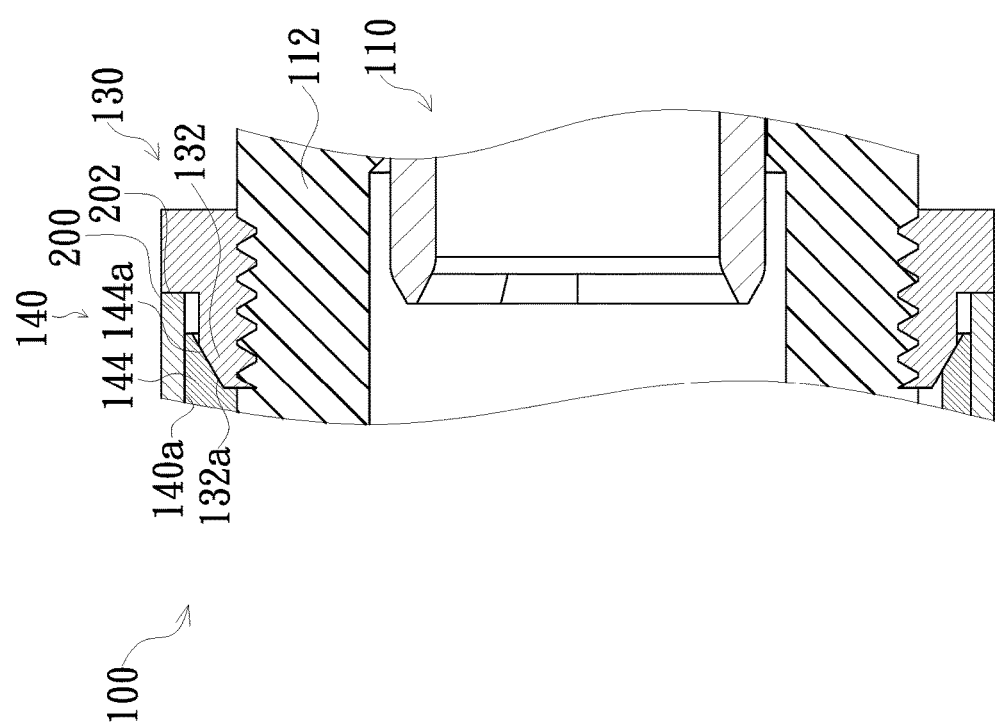
FIG. 3 shows a schematic diagram of a bicycle component fastening device fastened to a handlebar of a bicycle according to the embodiment of the present disclosure.

FIG. 3 shows a schematic diagram of a bicycle component fastening device 100 fastened to a handlebar 200 of a bicycle according to the embodiment of the present disclosure. As shown in FIG. 3, when the operating, element 134 (please refer to FIG. 2) drives the second adjusting element 130 to move towards the fastening element 140, a portion of the second assembly end 132 relatively moves into a space between the beam 112 and the fastening element 140, such that the fastening element 140 moves away from the beam 112 and presses against an inner wall 202 of the handlebar 200, restricting the relative movement between the handlebar 200 and the bicycle component fastening device 100. In other words, the handlebar 200 and the bicycle component fastening device 100 are fastened to each other. Conversely, when the operating element 134 (please refer to FIG. 2) drives the second adjusting element 130 to move away from the first adjusting element 120 (please refer to FIG. 2), the second assembly end 132 moves out from the space between the beam 112 and the fastening element 140 such that the fastening element 140 moves towards the beam 112 and disengages the fastening between the handlebar 200 and the bicycle component fastening device 100, separating the handlebar 200 from the bicycle component fastening device 100. it should be understood that the present embodiment is only an example and not intended to limit the present disclosure.

Figure 4:
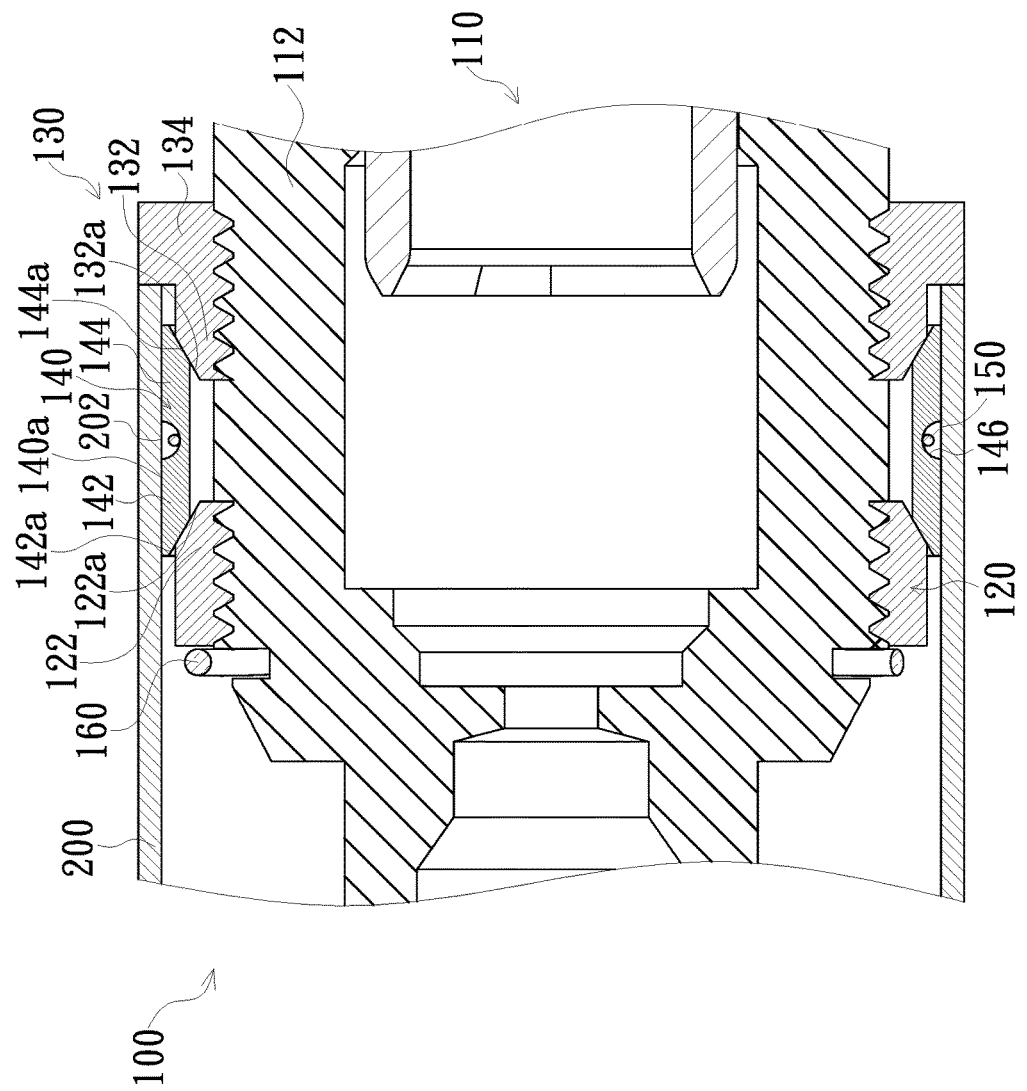
FIG. 4 shows a schematic diagram of a bicycle component fastening device fastened to a handlebar of a bicycle according to another embodiment of the present disclosure.

However, FIG. 4 shows a schematic diagram of a bicycle component fastening device 100 fastened to a handlebar 200 of a bicycle according to another embodiment of the present disclosure. As shown in FIG. 4, in the present embodiment a first abutting face 142a of the first assembly portion 142 of the fastening element 140 can be an inclined face, and a first top face 122a of the first assembly end 122 of the first adjusting element 120 can also be an inclined face, wherein the first abutting face 142a of the first assembly portion 142 corresponds to the first top face 122a of the first assembly end 122. Since the first adjusting element 120 is restricted to the beam 112, in other words since the first adjusting element 120 is restricted by the restricting element 160 to the beam 112, the first adjusting element 120 cannot move away from the second adjusting element 130. Therefore, when the second adjusting element 130 moves towards the first adjusting element 120 such that a portion of the second assembly end 132 moves into the space between the beam 112 and the fastening element 140, a portion of the first assembly end 122 also moves into a space between the beam 112 and the fastening element 140, causing the fastening element 140 to move away from the beam 112 and press against the inner wall 202 of the handlebar 200, restricting movement between the handlebar 200 and the bicycle component fastening device 100. In other words, the handlebar 200 and the bicycle component fastening device 100 are fastened to each other. Conversely, when the operating element 134 drives the second adjusting element 130 to move away from the first adjusting element 120, the second assembly end 132 moves out from the space between the beam 112 and the fastening element 140 and the first assembly end 122 moves out from the space between the beam 112 and the fastening element 140, such that the fastening element 140 moves towards the beam 112 and disengages the fastening between the handlebar 200 and the bicycle component fastening device 100, separating the handlebar 200 from the bicycle component fastening device 100. It should be understood that the present embodiment is only an example and not intended to limit the present disclosure.

Referring again to FIG. 1 and FIG. 2, the bicycle component fastening device 100 of the present embodiment can further include an elastic element 150 disposed at an outer wall 140a of the fastening element 140. When the handlebar 200 and the bicycle component fastening device 100 are separated, the fastening element 140 can provide a restoring force towards the beam 112. At such moment, the restoring force of the elastic element 150 can tighten the fastening element 140 inwards and drive the fastening element 140 to move towards the beam 112. In the present embodiment, the elastic element 150 can be a C-shaped elastic element 150, but is not limited thereto. Additionally, the fastening element 140 can be formed with an annular groove 146, annularly formed at the outer wall 140a of the fastening element 140, for accommodating the elastic element 150 and increasing the ability of the elastic element 150 to tighten the fastening element 140 inwards.

As disclosed by the abovementioned embodiments, the present disclosure has the following advantages. The bicycle component fastening device of the present disclosure can drive the second adjusting element to abut the fastening element, such that the fastening element presses against the inner wall of the handlebar of the bicycle, thereby fastening the bicycle component fastening device to the handlebar of the bicycle. In other words, the bicycle component fastening device of the present disclosure does not require screws to be fastened to the handlebar of the bicycle, and is convenient for users to assemble. Additionally, after the bicycle component fastening device is fastened to the handlebar, the handlebar has a larger interior space for accommodating hydraulic tubing.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A bicycle component fastening device configured to be installed to a handlebar of a bicycle and comprising:
    a bicycle component body having a beam configured to be partially disposed in the handlebar, wherein the beam is tubular;
    a first adjusting element coupled to the beam and having a first assembly end;
    a second adjusting element movably coupled to the beam and having a second assembly end and an operating element, wherein the operating element is configured to be arranged outside the handlebar and drives the second adjusting element to move toward or away from the first adjusting element;
    a fastening element having a first assembly portion and a second assembly portion, wherein the first assembly end of the first adjusting element abuts the first assembly portion, the second assembly end of the second adjusting element abuts the second assembly portion, and when the operating element drives the second adjusting element to move toward the first adjusting element, the second assembly end abuts the second assembly portion and drives the fastening element to move away from the beam and press against an inner wall of the handlebar; and
    a restricting element surrounding and coupled to the beam and selectively abutting an end portion of the first adjusting element distal from the second adjusting element, for restricting the first adjusting element from moving away from the second adjusting element.

2. The bicycle component fastening device according to claim 1, further comprising an elastic element arranged at an outer wall of the fastening element.

3. The bicycle component fastening device according to claim 2, wherein the outer wall of the fastening element is formed with an annular groove for accommodating the elastic element.

4. The bicycle component fastening device according to claim 2, wherein the elastic element is a C-shaped elastic element.

5. The bicycle component fastening device according to claim 1, wherein the fastening element has at least one opening, and the opening passes through the first assembly portion and the second assembly portion.

6. The bicycle component fastening device according to claim 1, wherein the first assembly portion has a first abutting face, the first abutting face contacts the first assembly end, the first abutting face is an inclined face, the first assembly end has a first top face, and the first top face is an inclined face corresponding to the first abutting face.

7. The bicycle component fastening device according to claim 1, wherein the second assembly portion has a second abutting face, the second abutting face contacts the second assembly end, the second abutting face is an inclined face, the second assembly end has a second top face, and the second top face is an inclined face corresponding to the second abutting face.

8. The bicycle component fastening device according to claim 1, wherein the second adjusting element is screwed to the beam, and the operating element drives the second adjusting element to move toward or away from the first adjusting element by screwing.

9. The bicycle component fastening device according to claim 1, wherein the beam is further formed with an accommodating groove and the restricting element is partially disposed in the accommodating groove.

* * * * *